(12) United States Patent
Tamura (10) Patent No.: US 11,117,144 B2
(45) Date of Patent: Sep. 14, 2021

(54) CYCLONE COLLECTOR

(71) Applicant: Tokyo Electron Limited, Tokyo (JP)

(72) Inventor: Akitake Tamura, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 106 days.

(21) Appl. No.: 16/618,348

(22) PCT Filed: Jan. 29, 2018

(86) PCT No.: PCT/JP2018/002617
§ 371 (c)(1),
(2) Date: Nov. 30, 2019

(87) PCT Pub. No.: WO2018/220896
PCT Pub. Date: Dec. 6, 2018

(65) Prior Publication Data
US 2021/0187519 A1 Jun. 24, 2021

(30) Foreign Application Priority Data
May 31, 2017 (JP) .............................. JP2017-108770

(51) Int. Cl.
*B01D 47/00* (2006.01)
*B04C 9/00* (2006.01)
(Continued)

(52) U.S. Cl.
CPC ............... *B04C 9/00* (2013.01); *B01D 45/14* (2013.01); *B01D 45/16* (2013.01); *B01D 47/00* (2013.01); *B01D 47/027* (2013.01); *B04C 5/04* (2013.01); *G01N 1/2211* (2013.01); *B04C 2009/008* (2013.01)

(58) Field of Classification Search
CPC ..... B01D 47/00; B01D 47/027; B01D 47/022
See application file for complete search history.

(56) References Cited

U.S. PATENT DOCUMENTS 6,508,864 B2 * 1/2003 Day .................... G01N 1/2211
                                                        95/219
10,222,363 B2    3/2019 Tamura

FOREIGN PATENT DOCUMENTS

CN    204107264 U  *  1/2015
DE    1 503 601 A      3/1969
(Continued)

OTHER PUBLICATIONS

International Search Report and Written Opinion (Application No. PCT/JP2018/002617) dated Apr. 24, 2018 (with English translation).
(Continued)

*Primary Examiner* — Robert A Hopkins
(74) *Attorney, Agent, or Firm* — Burr & Brown, PLLC (57) ABSTRACT

There is provided a cyclone collector which can securely collect particles from an intake gas and can prevent discharge of a water mist. The cyclone collector 12 includes a container 21, a liquid-film forming section 23 for forming a liquid film 40 in the container 21, a gas inlet 33 provided in a lid 32, and an exhaust pipe 24b. The gas inlet 33 extends downward at an angle with an orthogonal plane 21B perpendicular to the axis 21A of the container 21. The opening 33a of the gas inlet 33 opens in an area at a distance from the liquid film 40. An intake gas is ejected from the gas inlet 33 toward the liquid film 40.

8 Claims, 8 Drawing Sheets

(51) Int. Cl.
  *B01D 45/14* (2006.01)
  *B01D 45/16* (2006.01)
  *G01N 1/22* (2006.01)
  *B04C 5/04* (2006.01)
  *B01D 47/02* (2006.01)

(56) References Cited

FOREIGN PATENT DOCUMENTS

| | | |
|---|---|---|
| DE | 34 35 214 A1 | 4/1986 |
| EP | 3 150 993 A1 | 4/2017 |
| GB | 922494 | 4/1963 |
| JP | 0 487 203 A2 | 5/1992 |
| JP | H04-053464 U | 5/1992 |
| JP | H04-077096 U | 7/1992 |
| JP | H06-126215 A1 | 5/1994 |
| JP | 2002-543975 A1 | 12/2002 |
| JP | 2006-314917 A1 | 11/2006 |
| JP | 2015-174013 A1 | 10/2015 |
| JP | 2015-174073 A1 | 10/2015 |
| JP | 2015-217325 A1 | 12/2015 |
| JP | 2015-224991 A1 | 12/2015 |
| JP | 2015-224992 A1 | 12/2015 |
| WO | 2005/007298 A1 | 1/2005 |

OTHER PUBLICATIONS

Extended European Search Report (Application No. 18808720.9) dated Feb. 1, 2021.
English translation of International Preliminary Report on Patentability (Chapter I) (Application No. PCT/JP2018/002617) dated Dec. 12, 2019, 10 pages.
Japanese Office Action (Application No. 2019-521950) dated Oct. 16, 2020 (with English translation).

* cited by examiner

CYCLONE COLLECTOR

TECHNICAL FIELD

The present invention relates to a cyclone collector for collecting particles by using a liquid film.

BACKGROUND ART

A cyclone collector is conventionally known which includes a container that forms a cylindrical space, and in which a liquid film is formed on the interior surface of the container. The cyclone collector causes particles in an intake gas to adhere to the liquid film, thereby collecting the particles (see patent document 1).

However, if a gas inlet opens at a position near the liquid film, a mist will be generated from the liquid film. The mist is discharged through an exhaust pipe, resulting in a decrease in the collection efficiency. On the other hand, if an intake gas from the gas inlet hits an area which is at a distance from the liquid film and in which no liquid film is formed, particles in the intake gas cannot be securely collected in the liquid film.

CITATION LIST

Patent Literature

Patent document 1: Published Japanese Translation No. 2002-543975 of the PCT International Publication

SUMMARY OF THE INVENTION

Problems to be Solved by the Invention

The present invention has been made in view of the above situation. It is therefore an object of the present invention to provide a cyclone collector which can securely collect particles from an intake gas and which will not discharge a mist.

Means for Solving the Problems

The present invention provides a cyclone collector, comprising: a container which internally forms a space and which consists of a rotating body having an axis of rotation, and including an upper-end portion, a lower-end portion, and a side wall extending between the upper-end portion and the lower-end portion; a liquid-film forming section, provided for the container, for forming a liquid film having a certain height on an interior surface of the side wall, a gas inlet provided in the container and having an opening that opens in the container; and an exhaust pipe provided in the container, wherein the gas inlet extends toward the space at an angle with an orthogonal plane perpendicular to the axis of rotation of the container, and wherein the entire area of the opening of the gas inlet is located outside an area where the liquid film exists, and an intake gas is ejected from the gas inlet toward the liquid film.

In a preferred embodiment of the present invention, the gas inlet is provided in the upper-end portion of the container.

In a preferred embodiment of the present invention, the liquid-film forming section forms the liquid film on the interior surface of the side wall such that it extends upward from the lower-end portion of the container.

In a preferred embodiment of the present invention, the gas inlet is provided in plural numbers.

In a preferred embodiment of the present invention, the gas inlet is provided in the upper-end portion of the container, and the opening opens into the space in the container.

In a preferred embodiment of the present invention, the gas inlet is provided in the upper-end portion of the container, and has a projecting nozzle which projects from the surface of the upper-end portion and which, at its front end, has said opening.

In a preferred embodiment of the present invention, a liquid supply section is mounted to the lower-end portion of the container.

In a preferred embodiment of the present invention, a liquid supply section is mounted to the side wall of the container.

Advantageous Effects of the Invention

According to the present invention, it becomes possible to securely collect particles from an intake gas, and to prevent discharge of a mist.

BRIEF DESCRIPTION OF THE DRAWINGS

FIG. 6($a$) is a schematic diagram illustrating a detection target particle to which a fluorescent substance is bonded, and FIG. 6($b$) is a schematic diagram illustrating a detection target particle to which an agglomerated antibody particle is bonded;

DESCRIPTION OF THE EMBODIMENTS

First Embodiment

A first embodiment of the present invention will now be described in detail. The below-described embodiments should not be construed to limit the scope of the invention disclosed herein. Further, the embodiments may be appropriately combined as long as it does not create a contradiction.

A cyclone body 21 of a cyclone collector 12 according to the present invention consists of a rotating body having an axis of rotation (also referred to as an axis) 21A. As used herein, the terms "upward", "upper end", "downward" and "lower end" refer to "upward", "upper end", "downward" and "lower end" in the case where the cyclone body 21 of the cyclone collector 12 according to the present invention is installed such that the axis of rotation 21A extends in the vertical and longitudinal direction (see FIGS. 1A through 1C).

At the outset, the entire measuring apparatus 10, in which the cyclone collector 12 according to the present invention is incorporated, will be described with reference to FIGS. 5 through 9.

Figure 5:
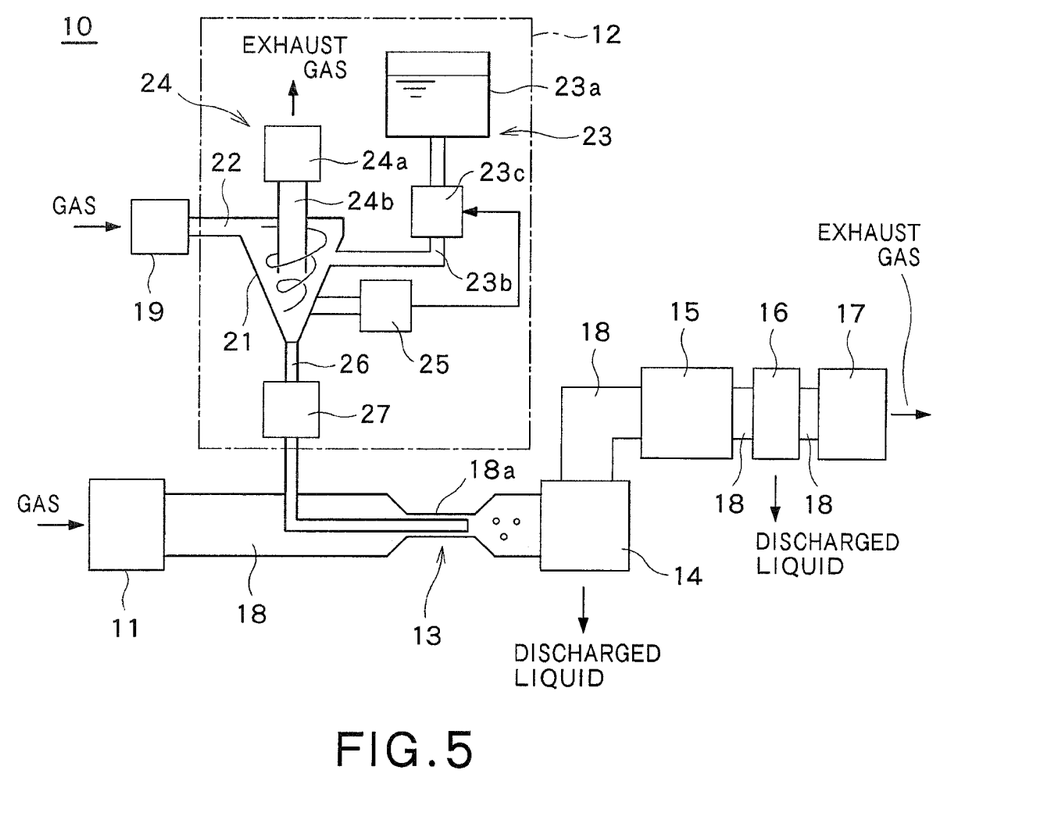
FIG. 5 is a schematic view showing the overall construction of a measuring apparatus incorporating a cyclone collector according to the present invention.

FIG. 5 is a schematic view showing the overall construction of the measuring apparatus. FIG. 5 illustrates a case in which the measuring apparatus 10 detects detection target particles based on the fluorescence intensities of droplets. However, the present invention is not limited to such a case. For example, the measuring apparatus 10 may only perform measurement of the fluorescence intensities of droplets. In that case, based on the fluorescence intensities measured by the measuring apparatus 10, the user or another apparatus will determine whether detection target particles are contained in an analyte gas. The detection target particles are, for example, virus particles, bacteria particles, pollen particles, particles of a toxic substance, etc.; however, the detection target particles are not limited to these as long as a fluorescent substance can specifically bind to the target particles.

As shown in FIG. 5, in this embodiment the measuring apparatus 10 includes a dust removal section 11, a main pipe 18, a collection section (also referred to as a cyclone collector) 12 according to the present invention, a droplet forming section 13, a droplet sorting section 14, a measuring section 15, a liquid recovery section 16, and a suction pump 17.

Next, a positional relationship between the components will be described briefly. The main pipe 18 is a guide passage for a gas flow. The dust removal section 11 is disposed upstream in a gas flow which is guided by the main pipe 18. The suction pump 17 is a gas flow forming mechanism for forming a gas flow in the main pipe 18, and is disposed downstream in the gas flow which is guided by the main pipe 18. In other words, the suction pump 17 is configured to form a gas flow that flows from the dust removal section 11 to the suction pump 17 in the main pipe 18. It is also possible to provide, as a gas flow forming mechanism, a gas feed pump upstream of the dust removal section 11. In that case, compressed air may be supplied from the gas feed pump into the main pipe 18.

The droplet forming section 13, the droplet sorting section 14, the measuring section 15 and the liquid recovery section 16 are provided in this order between the dust removal section 11 and the suction pump 17 in the main pipe 18.

Next, the construction of each component will be described. The dust removal section 11 has a degree of gas flow resistance which is necessary to form aerosol droplets in the main pipe 18. The dust removal section 11 is configured to be capable of supplying a clean gas by capturing particles that affect the measurement.

The collection section 12 consisting of a cyclone collector will now be described. The collection section 12 is configured to collect, in a liquid, detection target particles contained in an analyte gas, and to cause a fluorescent substance, which specifically binds to the detection target particles, to bind to the detection target particles in the liquid.

In this embodiment, as shown in FIG. 5, the collection section 12 includes a cyclone body (also referred to as a container) 21, a gas introduction section 22 for introducing a gas into the cyclone body 21, and a liquid introduction section 23 for introducing a liquid into the cyclone body 21.

The cyclone body 21 has a truncated cone-shaped interior surface (hereinafter referred to as a wall surface), and is oriented such that the small-diameter end is located below the large-diameter end.

The gas introduction section 22 is provided on an upper portion of the cyclone body 21 such that it extends in a direction tangent to the wall surface of the cyclone body 21, and is airtightly coupled to a coarse dust removal section 19. The direction tangent to the wall surface herein refers to a direction tangent to a circle which is defined when the cyclone body 21 is cut off in a horizontal direction, which is perpendicular to the axis of the cyclone body 21, in a portion where a gas, introduced in the below-described manner, hits (collides against) the wall surface of the cyclone body 21. The coarse dust removal section 19 is configured to collect relatively large particles, such as dust and fibers, while allowing passage of analyte particles. The gas, which has been introduced from the coarse dust removal section 19 into the cyclone body 21 through the gas introduction section 22, is guided along the wall surface of the cyclone body 21 so that the gas swirls in the circumferential direction.

The liquid introduction section 23 includes a tank 23a for storing a liquid, a liquid introduction pipe 23b which, at its one end, is connected to the bottom of the tank 23a and, at the other end, is connected to the wall surface of the cyclone body 21, and a flow rate control section 23c provided in the liquid introduction pipe 23b.

Figure 6A:
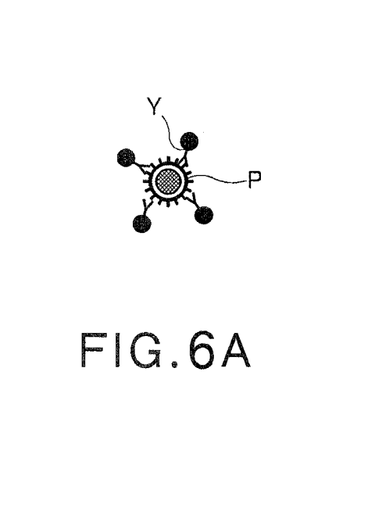

In this embodiment, the tank 23a stores a liquid containing a fluorescent substance. The fluorescent substance is, for example, a fluorescence-labeled antibody. As shown in FIG. 6(a), a fluorescence-labeled antibody Y uses an antibody-antigen reaction to specifically bind to a particular detection target particle P.

Figure 6B:
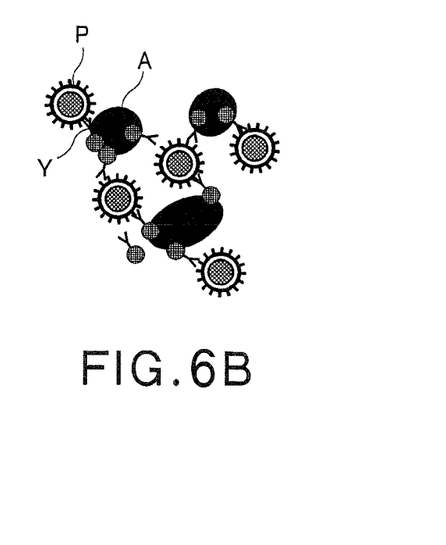
Figure 7:
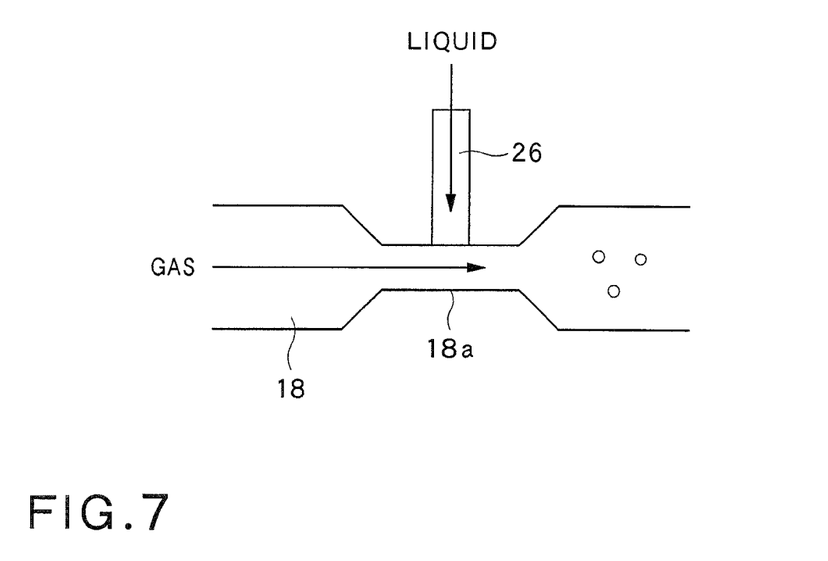
FIG. 7 is a schematic view showing a variation of the construction of a droplet forming section of the measuring apparatus.

As shown in FIG. 6(b), the fluorescent substance may take the form of an agglomerated antibody particle A whose surface is modified with a plurality of fluorescence-labeled antibodies Y. In this case, the fluorescence-labeled antibodies Y in the surface of the antibody particle A each use an antibody-antigen reaction to specifically bind to a particular detection target particle P. Thus, a plurality of detection target particles P can be agglomerated via the agglomerated antibody particle A. This makes it possible to increase the volume density of fluorescence-labeled antibodies Y, thereby enhancing the fluorescence intensity.

The above-mentioned other end of the liquid introduction pipe 23b is connected to the wall surface of the cyclone body 21 at a position lower than the gas introduction section 22. On the other hand, the above-mentioned one end of the liquid introduction pipe 23b is disposed at a position higher than the above-mentioned other end. When the flow rate control section 23c is opened, the liquid stored in the tank 23a is allowed by gravity to flow through the liquid introduction pipe 23b into the cyclone body 21.

The liquid introduction section 23 is not limited to such a construction. For example, the liquid introduction section 23 may include a syringe pump storing a liquid containing a fluorescent substance. The front end of the syringe is coupled to the wall surface of the cyclone body 21 so that when the interior of the syringe is pressurized by a piston, the fluorescent substance-containing liquid is introduced into the cyclone body 21.

In this embodiment, above the cyclone body 21 is provided a suction/exhaust section 24 for exhausting by suction and thereby depressurizing the interior of the cyclone body 21 so that by the differential pressure, a gas will be introduced from the gas introduction section 22 into the cyclone body 21 in such a manner that the gas swirls in the circumferential direction.

The suction/exhaust section 24 includes a suction/exhaust pipe (also referred to as an exhaust pipe) 24b concentrically inserted into an upper portion of the cyclone body 21, and a suction/exhaust pump 24a provided for the suction/exhaust pipe 24b.

When the suction/exhaust pump 24a is actuated, the interior of the suction/exhaust pump 24a is exhausted by suction and depressurized through the suction/exhaust pipe 24b and, by the differential pressure between the inside and the outside of the cyclone body 21, the gas outside the cyclone body 21 is forced through the coarse dust removal section 19 and drawn from the gas introduction section 22 into the cyclone body 21. The gas which has been introduced into the cyclone body 21 is guided along the wall surface of the cyclone body 21, so that the gas descends while swirling in the circumferential direction, i.e. the gas forms a swirling gas flow. Detection target particles in the gas have a relatively high specific gravity, and therefore the detection target particles are separated toward the wall surface of the cyclone body 21 due to centrifugal force.

On the other hand, the gaseous component having a relatively low specific gravity reverses its flow direction at the bottom of the cyclone body 21 due to the truncated conical shape of the cyclone body 21 and forms an upward flow along the central axis of the cyclone body 21, and is discharged to the outside through the suction/exhaust pipe 24b.

The liquid that has been introduced from the liquid introduction section 23 into the cyclone body 21 is forced outward by the gas flow swirling in the circumferential direction, and forms a liquid film along the wall surface (interior surface) of the cyclone body 21. The liquid introduction section 23 thus functions as a liquid-film forming section for forming a liquid film on the interior surface of the cyclone body 21.

In this embodiment, a liquid-level detector 25 is provided for detecting the level of the liquid formed in the shape of a film on the wall surface of the cyclone body 21. The flow rate control section 23c of the liquid introduction section 23 controls the flow rate of the liquid based on the results of detection by the liquid-level detector 25.

In particular, the liquid-level detector 25 includes a pair of electrodes exposed in the interior of the cyclone body 21, and a measurement section for measuring the electrical conductivity between the electrodes. When the level of the liquid is higher than the height position of the pair of electrodes, electricity passes between the pair of electrodes through the liquid; thus, the electrical conductivity is relatively high. On the other hand, when the level of the liquid is lower than the height position of the pair of electrodes, the pair of electrodes are insulated from each other; thus, the electrical conductivity is relatively low. An electrical conductivity in the case where the level of the liquid is higher than the height position of the pair of electrodes and an electrical conductivity in the case where the level of the liquid is lower than the height position of the pair of electrodes are experimentally determined in advance, and a value intermediate between the two measurement values is determined as a threshold. When an electrical conductivity, later measured by the measurement section, is higher than the threshold, then the level of the liquid is determined to be higher than the height position of the pair of electrodes. When an electrical conductivity, later measured by the measurement section, is lower than the threshold, then the level of the liquid is determined to be lower than the height position of the pair of electrodes.

When the liquid-level detector 25 determines that the level of the liquid is lower than the height position of the pair of electrodes, the flow rate control section 23c increases the flow rate of the liquid until the level of the liquid becomes higher than the height position of the pair of electrodes. This can prevent the gas-contact area of the liquid in the cyclone body 21 from decreasing due to discharge or evaporation of the liquid.

A liquid supply section 26 is connected to the bottom of the cyclone body 21. The liquid supply section 26 is provided with a feed pump 27.

The feed pump 27 discharges the liquid from the liquid supply section 26 while applying a pressure to the liquid.

Therefore, though the interior of the cyclone body 21 is depressurized by the suction/exhaust section 24, the liquid can be continuously and stably supplied from the cyclone body 21 to the droplet forming section 13 via the liquid supply section 26.

Though not essential, the collection section 12 may be equipped with a heating mechanism for heating the liquid. When the reactivity of the fluorescent substance is low in a low temperature environment, e.g. in cold climates, the fluorescent substance in the liquid can be activated and the reaction rate can be increased by heating the liquid up to, for example, around body temperature (about 35° C.).

Alternatively, the collection section 12 may be equipped with a cooling mechanism (not shown) for cooling the liquid. When the reactivity of the fluorescent substance is low in a high temperature environment, e.g. in extremely hot climates, the fluorescent substance in the liquid can be activated and the reaction rate can be increased by cooling the liquid down to, for example, around body temperature (about 35° C.).

Next, the droplet forming section 13 will be described. The droplet forming section 13 is configured to form aerosol droplets from the liquid supplied from the collection section 12. In particular, the droplet forming section 13 is configured to form aerosol droplets from the liquid, supplied from the collection section 12, by using at least one (two-fluid nozzle) of a nebulizer, an electrospray, a twin-fluid nozzle, a piezoelectric element, ultrasonic waves, and a decompression treatment.

Figures 1A, 1B:
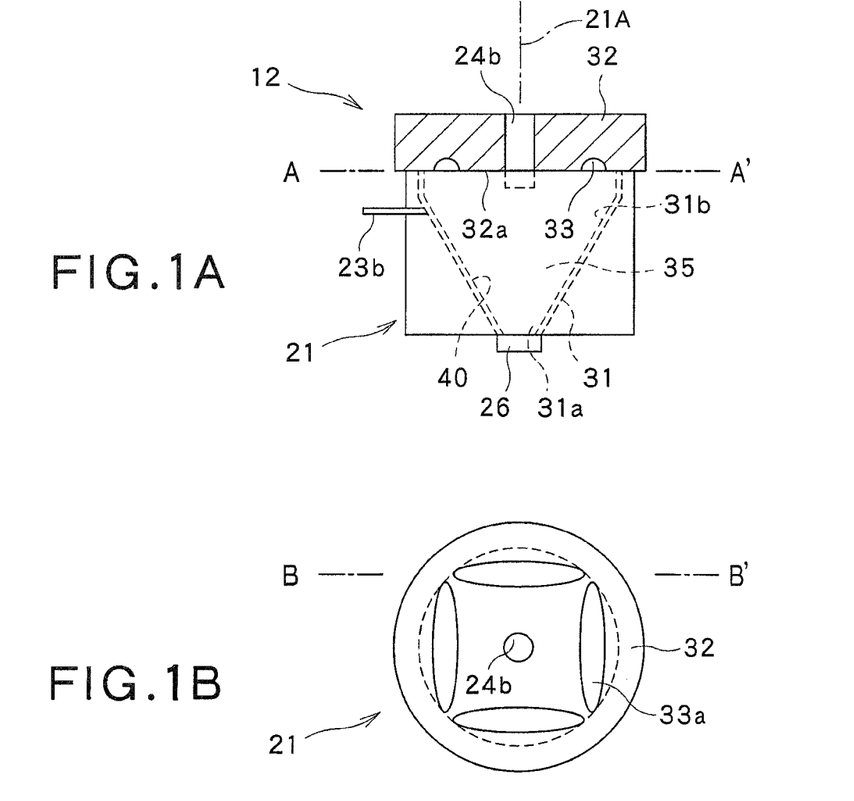
FIG. 1A is a side view of a cyclone body of a collection section according to a first embodiment of the present invention.
FIG. 1B is a bottom view of a lid as viewed from line A-A' of FIG. 1A.
Figure 1C:
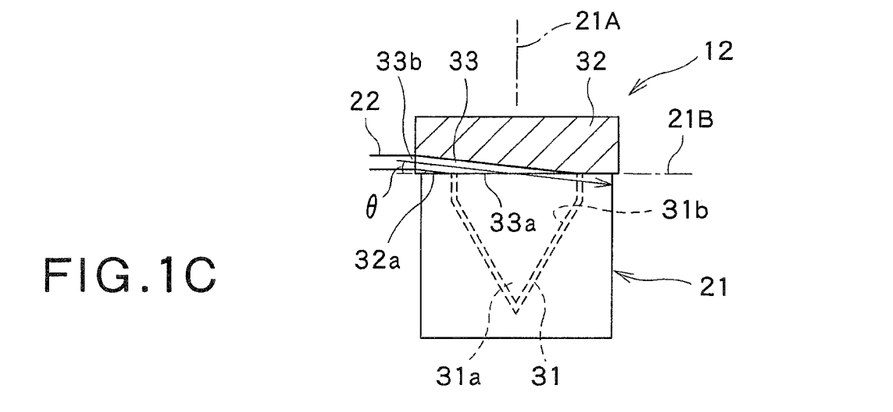
FIG. 1C is a cross-sectional view on line B-B' of FIG. 1B, showing the cyclone body.

In this embodiment, as shown in FIG. 5, the droplet forming section 13 includes a narrowed portion 18a where the bore of the main pipe 18 is sharply narrowed. The end of the liquid supply section 26 is coaxially inserted into the narrowed portion 18a. The speed of a gas flow, flowing in the main pipe 18, increases when it flows through the narrowed portion 18a. The fast gas flow, flowing through the narrowed portion 18a, creates a negative pressure at the end of the liquid supply section 26. The negative pressure sucks and tears the liquid in the liquid supply section 26, whereby aerosol droplets are formed from the liquid supplied from the liquid supply section 26.

Though in the embodiment illustrated in FIG. 5, the end of the liquid supply section 26 is coaxially inserted into the narrowed portion 18*a*, the present invention is not limited to this feature. For example, as shown in FIG. 7, the end of the liquid supply section 26 may be orthogonally coupled to the narrowed portion 18*a*.

Next, the droplet sorting section 14 will be described. The droplet sorting section 14 is configured to sort out droplets having a diameter of less than a predetermined value from the droplets supplied from the droplet forming section 13.

For example, a spray chamber which uses inertial force to sort out droplets having a diameter of less than a predetermined value can be used as the droplet sorting section 14. More specifically, the spray chamber may be one selected from the group consisting of a cyclone spray chamber, a Scott-type spray chamber and an inertia branch-type spray chamber. Such spray chambers are known per se in the art of inductively coupled plasma (ICP) emission spectroscopic analysis and described, for example, in JIS K0133. However, this embodiment does not achieve the effect of sorting out droplets, having such a diameter as to be resolvable by inductively coupled plasma, by solely using a spray chamber, but achieves the following effect: As described later, the use of a spray chamber is combined with the technique of using a fluorescent substance which specifically binds to detection target particles. The combination increases the difference between the fluorescence intensity of a droplet containing no detection target particle and the fluorescence intensity of a droplet containing a detection target particle, thereby making it possible to detect target particles with high accuracy. This effect is unexpected from conventionally known spray chambers.

FIG. 8 is a schematic view showing an example of the construction of the droplet sorting section 14. The droplet sorting section 14 shown in FIG. 8 is a cyclone spray chamber and includes a central chamber body 14*a* having a cylindrical interior surface, an upper chamber body 14*b* coupled to the upper end of the central portion and having a truncated conical interior surface, and a lower chamber body 14*c* coupled to the lower end of the central portion and having a truncated conical interior surface.

The main pipe 18 is connected to the interior surface of the central chamber body 14*a* such that it extends in a direction tangent to the interior surface. The gas flow containing droplets, which has flown through the main pipe 18 and has been introduced into the central chamber body 14*a*, is guided along the interior surface of the central chamber body 14*a* due to inertial force and swirls in the circumferential direction. Droplets having a diameter of not less than the predetermined value are separated toward the interior surface of the central chamber body 14*a* due to centrifugal force, hitting and adhering to the interior surface. In this manner, droplets having a diameter of not less than the predetermined value are removed from the gas flow, while droplets having a diameter of less than the predetermined value are carried by the gas flow and supplied from the top of the upper chamber body 14*b* to the measuring section 15. The droplets (liquid) that have adhered to the interior surface of the central chamber body 14*a* flow down by gravity into the lower chamber body 14*c*, and are discharged to the outside from the bottom of the lower chamber body 14*c*. In cases where only a small amount of droplets (liquid) adhere to the interior surface of the central chamber body 14*a*, the adhering droplets (liquid) will evaporate. Therefore, there is no need to provide a liquid discharge mechanism.

Since a spray chamber uses inertial force to sort out droplets, the upper limit of the diameters of droplets to be sorted out by the spray chamber is correlated with dynamic parameters such as the size and the shape of the spray chamber, the speed of the gas flow, etc. Accordingly, the upper limit of the diameters of droplets to be sorted out by the spray chamber can be set to a desired value by appropriately selecting dynamic parameters such as the size and the shape of the spray chamber, the speed of the gas flow, etc. While the diameter of droplets to be sorted out by the spray chamber can be appropriately selected depending on the measuring object and the measurement purpose, it is preferably not more than 50 μm, more preferably not more than 20 μm when the measuring object is virus or bacteria.

Next, the measuring section 15 will be described. FIG. 9 is a schematic view showing an example of the construction of the measuring section 15. The measuring section 15 is configured to irradiate a droplet with light and measure the fluorescence intensity of the droplet.

In this embodiment, as shown in FIG. 9, the measuring section 15 includes a case body 56, e.g. having a rectangular shape, connected to the main pipe 18 and which forms a space that allows passage of a gas flow containing droplets that have been sorted out by the droplet sorting section 14. Light transmissive windows 52*a*, 52*b* made of quartz, which are parallel to each other, are disposed e.g. in the upper and lower walls (or the side walls) of the case body 56 which oppose each other.

Outside one light transmissive window 52*a* is provided a light-emitting section 51 for emitting laser light, having a wavelength which is different from the wavelength of the fluorescence emitted by the fluorescent substance, into the case body 56. Outside the other light transmissive window 52*b* is provided an optical filter 53 for blocking the light having a wavelength which is different from the wavelength of the fluorescence emitted by the fluorescent substance. Outside the optical filter 53 is provided a light-receiving section 54 for receiving the fluorescence of the fluorescent substance and converting it into an electrical signal. The light-receiving section 54 is, for example, a photomultiplier tube and configured to output, to a received-light output measuring section 55, for example an electric current of a signal level corresponding to the intensity of the light received from the optical filter 53.

The received-light output measuring section 55 is configured to, for example, convert an electric current into a voltage and compare a voltage signal Ia, which indicates the voltage after conversion, with a preset threshold Is and, when the voltage signal Ia is determined to be higher than the threshold Is, issue an alarm indicating detection of detection target particles or display the alarm on a not-shown display.

For the voltage signal Ia which is a signal corresponding to the intensity of the received light, the threshold Is can be determined as follows. The threshold Is is set to an intermediate value between a fluorescence intensity as measured when droplets, formed by the droplet forming section 13 in the case where no detection target particles are present in the analyte gas, pass through the case body 56 and a fluorescence intensity as measured when droplets, formed by the droplet forming section 13 in the case where detection target particles are contained in the analyte gas and the fluorescent substance is bonded to the detection target particles, pass through the case body 56. The fluorescence intensity, measured when no detection target particles are present in the analyte gas, corresponds to the intensity of fluorescence from the fluorescent substance adhering to dust contained in the gas passing through the case body 56, or to the intensity of fluorescence from the fluorescent substance contained in droplets containing no detection target particles. The fluorescent substance specifically binds to detection target particles. Therefore, roughly speaking, the density of the fluorescent substance is higher when detection target particles are present. Thus, a difference in the fluorescence intensity exists between the presence and absence of detection target particles.

Returning to FIG. 5, the liquid recovery section 16, e.g. comprised of a mesh body, for capturing droplets that have passed through the measuring section 15 is provided downstream of the measuring section 15. The suction pump 17 is provided downstream of the liquid recovery section 16 so that the gas, which has passed through the liquid recovery section 16, is discharged to the outside of the measuring apparatus 10 via a not-shown filter for removing by adsorption detection target particles. The liquid recovery section 16 is provided with a liquid discharge mechanism. However, in cases where the amount of droplets (liquid) passing through the liquid recovery section 16 is sufficiently small, the droplets (liquid) will evaporate; therefore, there is no need to provide a liquid discharge mechanism.

The collection section 12, consisting of the cyclone collector incorporated in the measuring apparatus 10, will now be described with reference to FIGS. 1A through 1C and FIGS. 4A and 4B.

FIG. 1A is a side view of the cyclone body 21 of the collection section 12, FIG. 1B is a bottom view of a lid as viewed from line A-A' of FIG. 1A, and FIG. 1C is a cross-sectional view on line B-B' of FIG. 1B, showing the cyclone body 21. FIGS. 4A and 4B are each a perspective view of the cyclone body.

As described above, the collection section 12 includes the cyclone body (also referred to as the container) 21, the gas introduction section 22 for introducing a gas into the cyclone body 21, and the liquid introduction section (also referred to as the liquid-film forming section) 23 for introducing a liquid into the cyclone body 21 and forming a liquid film 40 on the interior surface of the cyclone body 21.

More specifically, as shown in FIGS. 1A through 1C and FIGS. 4A and 4B, the cyclone body (container) 21 of the collection section 12 includes a container body 31 that internally forms a truncated conical space 35, and a lid 32 that overs the top opening of the container body 31. The liquid introduction pipe 23*b* of the liquid introduction section 23 is connected to the side of the container body 31 of the cyclone body 21. The cyclone body 21 including the container body 31 and the lid 32 is a rotating body having an axis of rotation 21A, and is disposed such that the axis 21A extends in the longitudinal direction. The cyclone body 21 is not limited to the one having the above structure, i.e. including the container body 31, and the lid 32 that covers the top opening of the container body 31. For example, the cyclone body 21 may have a structure in which the container body 31 and the lid 32 are formed completely integrally and which has been obtained by using, for example, a 3D printer. In that case, the lid 32 of the cyclone body 21 constitutes an upper-end portion of the cyclone body 21, and the truncated conical side wall 31*b* of the container body 31 constitutes the side wall 31*b* of the cyclone body 21. Further, the lower-end portion 31*a* of the container body 31 constitutes the lower-end portion 31*a* of the cyclone body 21.

The gas introduction section 22 is coupled to the lid 32 constituting the upper end of the cyclone body 21, and to the gas introduction section 22 is connected a connection end 33*b* of a gas inlet 33 formed in the lid 32. In this embodiment, four gas introduction sections 22 are coupled to the lid 32 such that each gas introduction section 22 extends in a direction tangent to the wall surface of the cyclone body 21. The four gas introduction sections 22 are disposed at 90-degree intervals around the circumference of the lid 32. Thus, four gas inlets 33, corresponding to the four gas introduction sections 22, are provided at 90-degree intervals in the lid 32. The direction tangent to the wall surface herein refers to a direction tangent to a circle which is defined when the cyclone body 21 is cut off in a horizontal direction, which is perpendicular to the axis of the cyclone body 21, in a portion where the gas introduced hits (collides against) the wall surface of the cyclone body 21. In the case of four gas introduction sections 22, the gases introduced from the four sections preferably hit (collide against) the wall surface of the cyclone body 21 at the same height position. Thus, the four gas introduction sections 22 preferably extend in directions tangent to the same circle.

An exhaust pipe 24*b* is mounted in the center of the lid 32. The exhaust pipe 24*b* extends upward from the space 35 in the container body 31 and penetrates the lid 32. The liquid supply section 26 is mounted to the lower-end portion 31*a* of the container body 31 of the cyclone body 21. The liquid supply section 26 is connected to the droplet forming section 13 via the feed pump 27.

The four gas inlets 33, provided in the lid 32, will now be described. Each gas inlet 33 extends in the lid 32 downward at an inclination angle $\theta$ of 5° to 15° with an orthogonal plane 21B perpendicular to the axis 21A of the cyclone body 21. Each gas inlet 33 has an opening 33*a* that opens into the space 35 in the container body 31. The opening 33*a* opens in the same plane as the lower surface 32*a* of the lid 32 without projecting downward from the lower surface 32*a*.

A liquid film 40, composed of the liquid that has been introduced from the liquid introduction pipe 23*b* of the liquid introduction section 23, is formed on the interior surface of the cyclone body 21. The liquid film 40 is formed over an area from the lower end to the upper end of the container body 31, in particular an area from the lower-end portion 31*a* of the container body 31 to a position on the side wall 31*b* just below the lid 32. The liquid film 40 does not reach the lower surface 32*a* of the lid 32.

The openings 33*a* of the gas inlets 33 provided in the lid 32 each open in the lower surface 32*a* of the lid 32 at a position at a distance from the side wall of the container body 31. Therefore, the liquid film 40 on the interior surface of the container body 31 will not be caught in the intake gas from the openings 33*a* of the gas inlets 33. This prevents the generation of a mist caused by the liquid film being caught in the intake gas.

On the other hand, since the gas inlets 33 extend downward at an angle with the orthogonal plane 21B of the cyclone body 21, the intake gas ejected from each gas inlet 33 hits the liquid film 40 formed on the interior surface of the container body 31 and located at a position facing the opening 33*a*. This enables particles, contained in the intake gas, to securely adhere to the liquid film 40, thus allowing the liquid film 40 to securely collect the particles.

If the intake gas ejected from each gas inlet 33 does not hit the liquid film 40 in the container body 31, then it may not be possible to cause particles in the intake gas to adhere to the liquid film 40. The particles may be forced to fly upward in the container body 31 and discharged from the exhaust pipe 24b.

In contrast, according to the present invention, the intake gas, ejected from each gas inlet 33 into the cyclone body 21, is ejected along a direction tangent to the wall surface of the cyclone body 21 in a portion where the gas hits the liquid film, and creates a gas flow that swirls in the circumferential direction of the cyclone body 21. Therefore, particles in the intake gas move toward the side wall 31b of the container body 31 due to centrifugal force. The particles in the intake gas ejected from the gas inlets 33 are thus allowed to securely hit and adhere to the liquid film 40, and then can be collected.

The operation of the thus-constructed measuring apparatus according to this embodiment will now be described.

First, as shown in FIG. 5, a gas (e.g. air) is drawn by the suction pump 17 into the main pipe 18 via the dust removal section 11, and a gas flow is created which flows through the droplet forming section 13, the droplet sorting section 14, the measuring section 15 and the liquid recovery section 16 in this order, and which is discharged via the suction pump 17 and the not-shown filter.

On the other hand, by the operation of the suction/exhaust pump 24a of the collection section 12, a gas (e.g. air) is drawn into the gas introduction sections 22 of the collection section 12 via the coarse dust removal section 19, and introduced from the gas introduction sections 22 into the cyclone body 21. Further, a liquid containing a fluorescent substance is introduced from the liquid introduction section 23 into the cyclone body 21.

The gas, which has been introduced from the gas introduction sections 22 into the cyclone body 21, is guided along the wall surface of the cyclone body 21, so that the gas swirls in the circumferential direction and creates a spiral flow in the cyclone body 21. The liquid, which has been introduced from the liquid introduction section 23 into the cyclone body 21, is forced radially outward by the spiral gas flow and forms into a film along the wall surface of the cyclone body 21.

Detection target particles contained in the gas are separated toward the wall surface of the cyclone body 21 due to centrifugal force, and collected in the film-shaped liquid. The fluorescent substance contained in the liquid specifically binds to the collected detection target particles.

The behavior of the gas in the cyclone body 21 will now be described with reference to FIGS. 1A through 1C.

As shown in FIGS. 1A through 1C, the intake gas, which has been introduced from the gas introduction sections 22, passes through the gas inlets 33 provided in the lid 32 and is ejected from the openings 33a of the gas inlets 33 into the space 35 in the container body 31.

The openings 33a of the gas inlets 33 are located at a distance from the side wall 31b of the container body 31 where the liquid film 40 is formed. Therefore, it is unlikely that the liquid film, formed on the interior surface of the container body 31, will be caught in the intake gas, resulting in the generation of a mist.

The intake gas, ejected from the openings 33a of the gas inlets 33, hits the liquid film 40 formed on the interior surface of the container body 31. This enables particles in the intake gas to securely adhere to and be collected in the liquid film 40.

The liquid in which detection target particles are collected on the wall surface of the cyclone body 21 gradually flows downward by gravity and, by the operation of the feed pump 27, is continuously supplied from the bottom of the cyclone body 21 to the droplet forming section 13 via the liquid supply section 26.

In the droplet forming section 13, the liquid supplied from the collection section 12 is drawn from the end of the liquid supply section 26 by the fast gas flow flowing through the narrowed portion 18a of the main pipe 18, and is formed into aerosol droplets. The aerosol droplets are carried by the gas flow in the main pipe 18 to the droplet sorting section 14.

Figure 8:
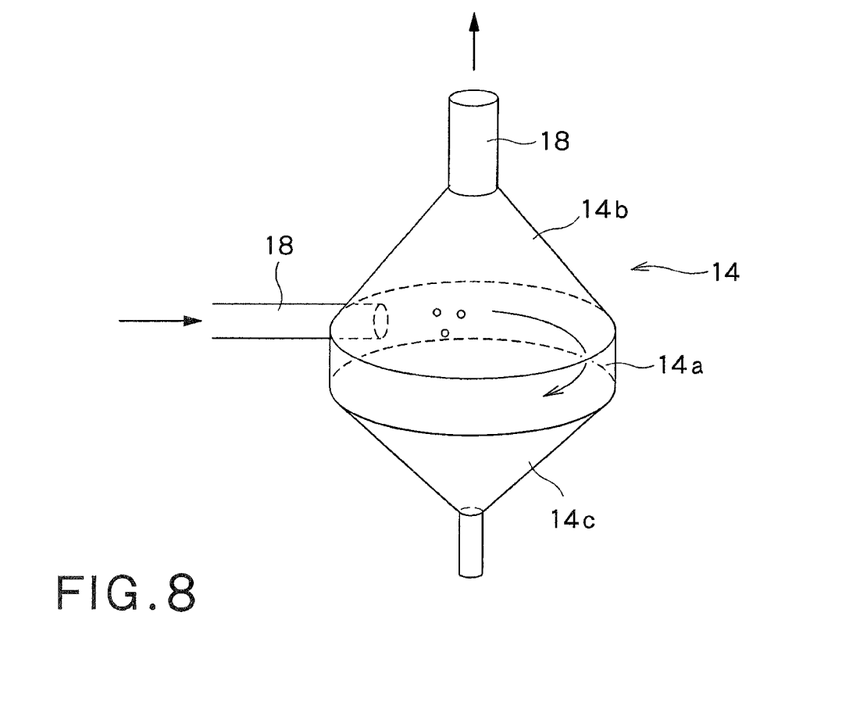
FIG. 8 is a perspective view showing the construction of a droplet sorting section of the measuring apparatus.

As shown in FIG. 8, in the droplet sorting section 14, the gas flow containing the droplets supplied from the droplet forming section 13 is guided along the cylindrical interior surface of the central chamber body 14a, whereby it swirls in the circumferential direction. Droplets having a diameter of not less than a predetermined value, contained in the gas flow, are separated toward the interior surface of the central chamber body 14a due to centrifugal force, and hit and adhere to the interior surface. On the other hand, droplets having a diameter of less than the predetermined value move upward while swirling in the circumferential direction together with the gas flow, and are supplied from the top of the upper chamber body 14b to the measuring section 15.

Figure 9:
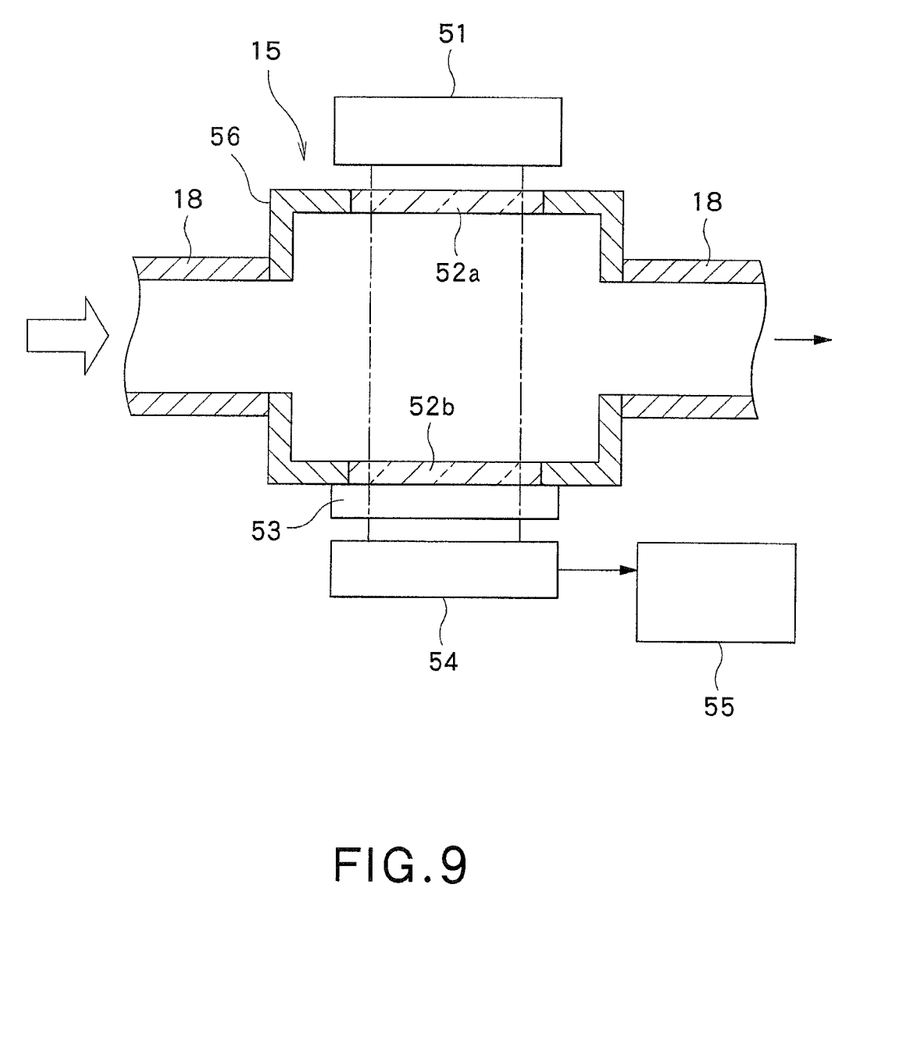
FIG. 9 is a diagram showing the internal construction of a measuring section of the measuring apparatus.

As shown in FIG. 9, the measuring section 15 irradiates droplets, which have been sorted out by the droplet sorting section 14, with light and measures the fluorescence intensities of the irradiated droplets. In particular, the measuring section 15 irradiates droplets, which have been guided by the main pipe 18, with light and measures the fluorescence intensities of the irradiated droplets. Thereafter, the measuring section 15, for example, determines whether detection target particles are contained in the analyte gas by comparing the measured fluorescence intensities with a threshold. In other words, the measuring section 15 detects detection target particles in the analyte gas.

For example, in the measuring section 15, the light-emitting section 51 emits ultraviolet laser light into the case body 56 through which droplets are flowing. A fluorescent substance in a droplet is excited by the ultraviolet laser light and emits fluorescence. The ultraviolet laser light is then blocked by the optical filter 53, and light having a fluorescence wavelength is selectively detected by the light-receiving section 54. The intensity of received light, detected by the light-receiving section 54, is proportional to the volume density of the fluorescent substance in a droplet formed by the droplet forming section 13.

In the case where detection target particles are present in droplets formed by the droplet forming section 13, the fluorescence intensities detected by the light-receiving section 54 are higher than the threshold Is, and the received-light output measuring section 55 issues an alarm indicating detection of detection target particles.

In the case where no detection target particles are present in droplets formed by the droplet forming section 13, even when fine dust in the air is incorporated into the droplets and the fluorescent substance adheres to the dust, the density of the fluorescent substance is much lower than the density of the fluorescent substance bonded to detection target particles. Accordingly, the intensity of received light detected by the light-receiving section 54 is lower than the preset threshold Is.

The gas flow containing droplets, which has passed through the measuring section 15, is separated into the gas and the liquid, and the liquid is recovered. The gas, on the other hand, is discharged to the outside of the measuring apparatus 10 by the suction pump 17 provided downstream of the liquid recovery section 16.

Second Embodiment

A collection section 12 consisting of a cyclone collector according to a second embodiment will now be described with reference to FIGS. 2A through 2C.

Figure 2A:
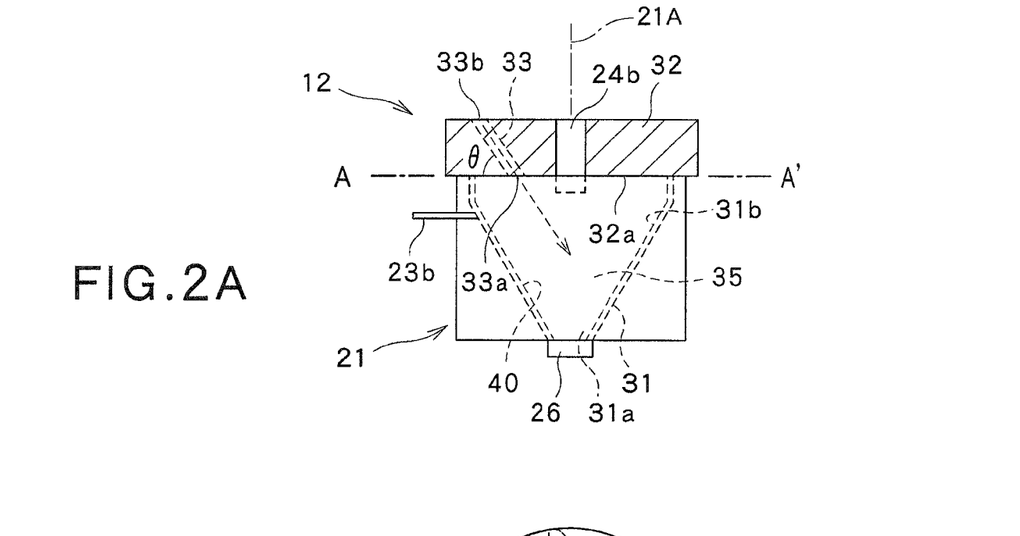
FIG. 2A is a side view of a cyclone body of a collection section according to a second embodiment of the present invention.
Figure 2B:
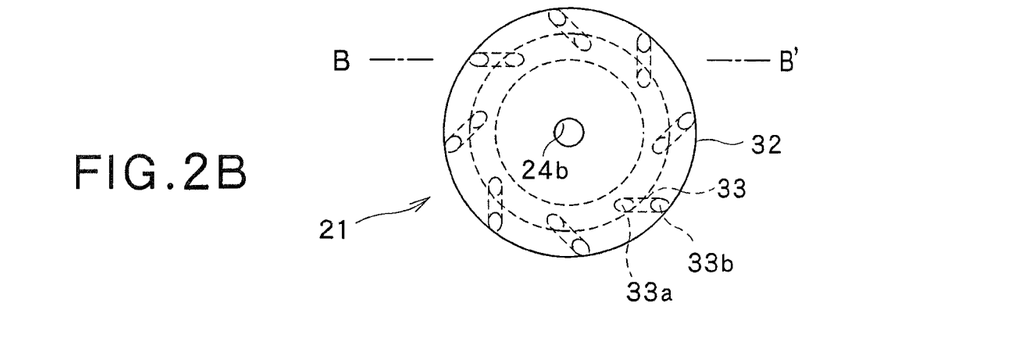
FIG. 2B is a bottom view of a lid as viewed from line A-A' of FIG. 2A.
Figure 2C:
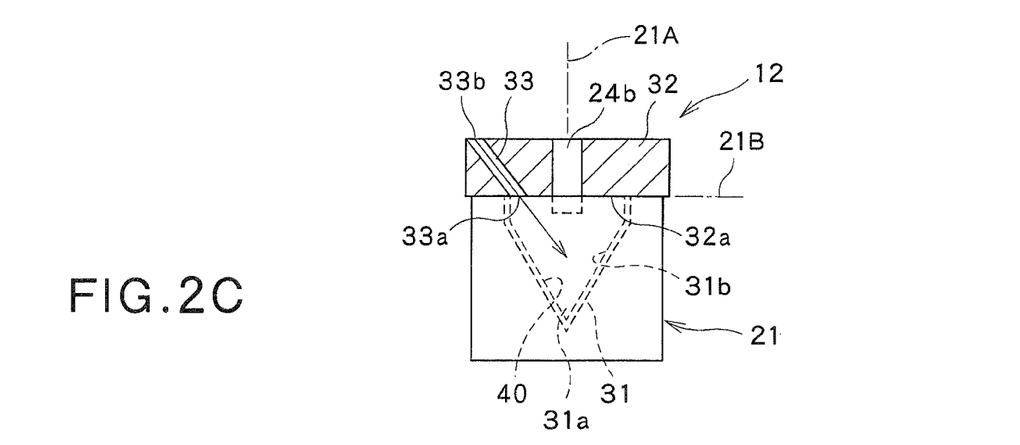
FIG. 2C is a cross-sectional view on line B-B' of FIG. 2B, showing the cyclone body.

In the second embodiment shown in FIGS. 2A through 2C, the same symbols are used for the same components or elements as those of the first embodiment shown in FIGS. 1A through 1C, FIGS. 4A and 4B, and FIGS. 5 through 9, and a detailed description thereof is omitted.

FIG. 2A is a side view of the cyclone body 21 of the collection section 12, FIG. 2B is a bottom view of a lid as viewed from line A-A' of FIG. 2A, and FIG. 2C is a cross-sectional view on line B-B' of FIG. 2B, showing the cyclone body 21.

As described above, the collection section 12 includes a cyclone body (also referred to as a container) 21, a gas introduction section 22 for introducing a gas into the cyclone body 21, and a liquid introduction section (also referred to as a liquid-film forming section) 23 for introducing a liquid into the cyclone body 21 and forming a liquid film 40 on the interior surface of the cyclone body 21.

More specifically, as shown in FIGS. 2A through 2C, the cyclone body (container) 21 of the collection section 12 includes a container body 31 that internally forms a truncated conical space 35, and a lid 32 that overs the top opening of the container body 31. The liquid introduction pipe 23b of the liquid introduction section 23 is connected to the side of the container body 31 of the cyclone body 21.

The gas introduction section 22 is coupled to the lid 32 of the cyclone body 21, and to the gas introduction section 22 is connected a connection end 33b of a gas inlet 33 formed in the lid 32. In this embodiment, eight gas introduction sections 22 are coupled to the lid 32 such that each gas introduction section 22 extends in a direction tangent to the wall surface of the cyclone body 21. The eight gas introduction sections 22 are disposed at 45-degree intervals around the circumference of the lid 32. Thus, eight gas inlets 33, corresponding to the eight gas introduction sections 22, are provided at 45-degree intervals in the lid 32.

An exhaust pipe 24b is mounted in the lid 32. The exhaust pipe 24b extends upward from the space 35 in the container body 31 and penetrates the lid 32.

The eight gas inlets 33, provided in the lid 32, will now be described. Each gas inlet 33 extends in the lid 32 downward at an inclination angle θ of 45° to 60° with an orthogonal plane 21B perpendicular to the axis 21A of the cyclone body 21. Each gas inlet 33 has an opening 33a that opens into the space 35 in the container body 31. The opening 33a opens in the same plane as the lower surface 32a of the lid 32 without projecting downward from the lower surface 32a.

A liquid film 40, composed of the liquid that has been introduced from the liquid introduction pipe 23b of the liquid introduction section 23, is formed on the interior surface of the cyclone body 21. The liquid film 40 is formed over an area from the lower end to the upper end of the container body 31, in particular an area from the lower-end portion 31a of the container body 31 to a position on the side wall 31b just below the lid 32. The liquid film 40 does not reach the lower surface 32a of the lid 32.

The openings 33a of the gas inlets 33 provided in the lid 32 each open in the lower surface 32a of the lid 32 at a position at a distance from the interior surface of the container body 31. Therefore, the liquid film 40 on the interior surface of the container body 31 will not be caught in the intake gas from the openings 33a of the gas inlets 33. This prevents the generation of a mist caused by the liquid film being caught in the intake gas.

On the other hand, since the gas inlets 33 extend downward at an angle with the orthogonal plane 21B of the cyclone body 21, the intake gas ejected from each gas inlet 33 hits the liquid film 40 formed on the interior surface of the container body 31 and located at a position facing the opening 33a. This enables particles, contained in the intake gas, to securely adhere to the liquid film 40, thus allowing the liquid film 40 to securely capture the particles.

If the intake gas ejected from each gas inlet 33 does not hit the liquid film 40 in the container body 31, then it may not be possible to cause particles in the intake gas to adhere to the liquid film 40. The particles may be forced to fly upward in the container body 31 and discharged from the exhaust pipe 24b.

In contrast, according to the present invention, the intake gas ejected from the gas inlets 33 is allowed to hit the liquid film 40. This makes it possible to cause particles in the intake gas to adhere to the liquid film 40, and to securely collect the particles in the liquid. According to this embodiment, the number of the gas inlets 33 is increased by increasing the angle θ of each gas inlet 33. This can increase the amount of gas that can be treated at a time. However, the gas flow hits the wall surface at a lower position.

Third Embodiment

A collection section 12 consisting of a cyclone collector according to a third embodiment will now be described with reference to FIGS. 3A through 3C.

Figure 3A:
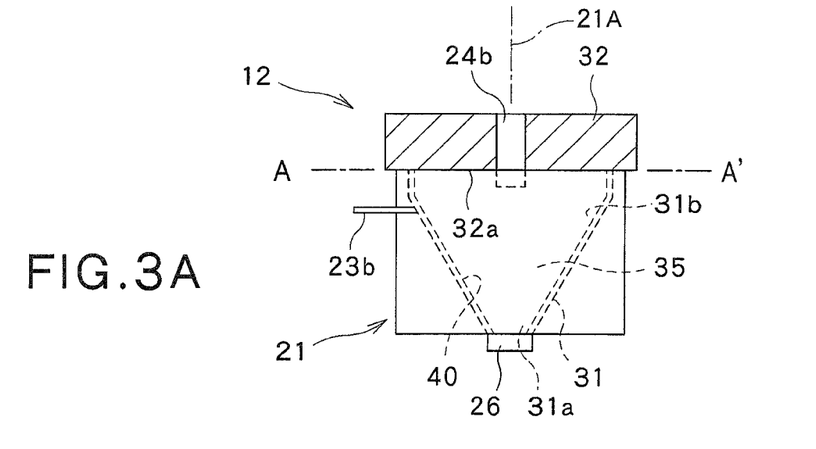
FIG. 3A is a side view of a cyclone body of a collection section according to a third embodiment of the present invention.
Figure 3B:
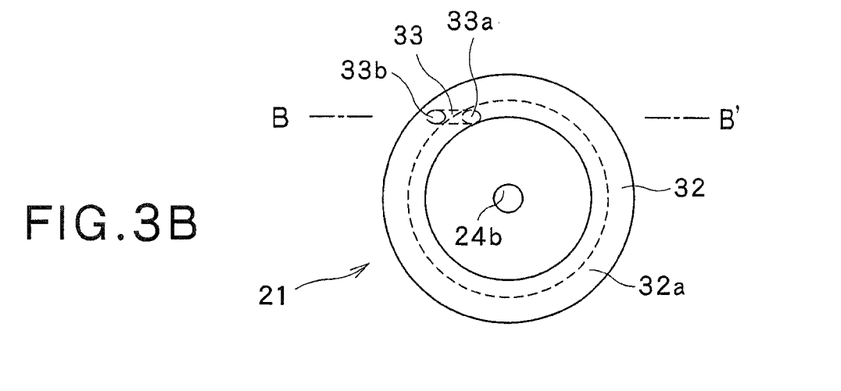
FIG. 3B is a bottom view of a lid as viewed from line A-A' of FIG. 3A.
Figure 3C:
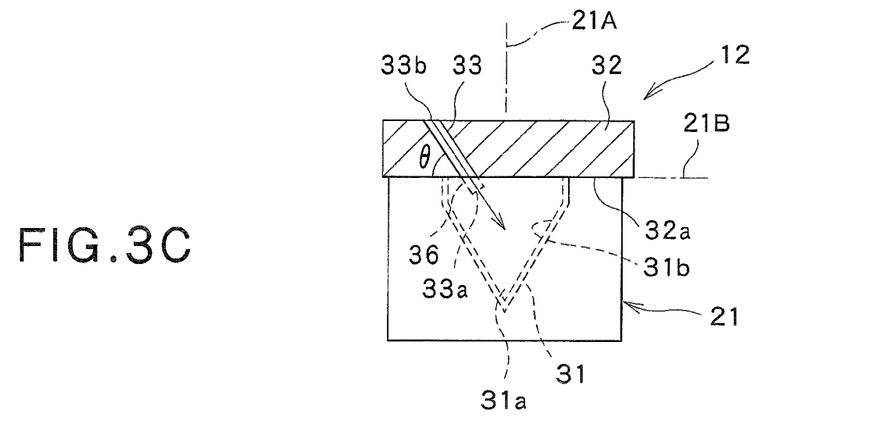
FIG. 3C is a cross-sectional view on line B-B' of FIG. 3B, showing the cyclone body.
Figure 4A:
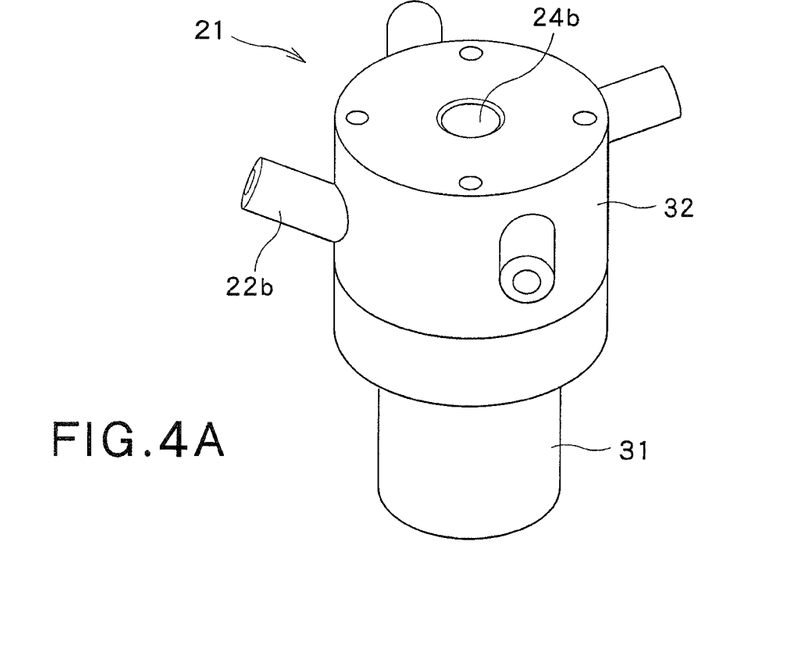
FIG. 4A is a perspective view of a cyclone body.
Figure 4B:
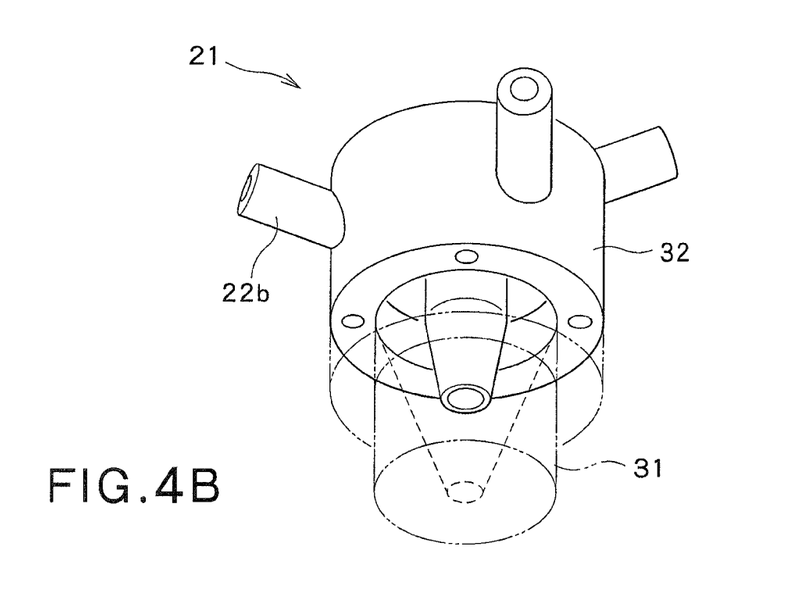
FIG. 4B is a perspective view of the cyclone body as viewed from an angle different from that of FIG. 4A.

In the third embodiment shown in FIGS. 3A through 3C, the same symbols are used for the same components or elements as those of the first embodiment shown in FIGS. 1A through 1C, FIGS. 4A and 4B, and FIGS. 5 through 9, and a detailed description thereof is omitted.

FIG. 3A is a side view of the cyclone body 21 of the collection section 12, FIG. 3B is a bottom view of a lid as viewed from line A-A' of FIG. 3A, and FIG. 3C is a cross-sectional view on line B-B' of FIG. 3B, showing the cyclone body 21.

As described above, the collection section 12 includes a cyclone body (also referred to as a container) 21, a gas introduction section 22 for introducing a gas into the cyclone body 21, and a liquid introduction section (also referred to as a liquid-film forming section) 23 for introducing a liquid into the cyclone body 21 and forming a liquid film 40 on the interior surface of the cyclone body 21.

More specifically, as shown in FIGS. 3A through 3C, the cyclone•body (container) 21 of the collection section 12 includes a container body 31 that internally forms a truncated conical space 35, and a lid 32 that overs the top opening of the container body 31. The liquid introduction pipe 23b of the liquid introduction section 23 is connected to the side of the container body 31 of the cyclone body 21.

The gas introduction section 22 is coupled to the lid 32 of the cyclone body 21, and to the gas introduction section 22 is connected a connection end 33b of a gas inlet 33 formed in the lid 32. In this embodiment, a single gas introduction section 22 is coupled to the lid 32. However, it is also possible to provide a plurality of gas introduction section 22, gas inlets 33 and projecting nozzles 36.

An exhaust pipe 24b is mounted in the lid 32. The exhaust pipe 24b extends upward from the space 35 in the container body 31 and penetrates the lid 32.

The gas inlet 33, provided in the lid 32, will now be described. The gas inlet 33 extends in the lid 32 downward at an inclination angle θ of 45° to 60° with an orthogonal plane 21B perpendicular to the axis 21A of the cyclone body 21. The gas inlet 33 has a projecting nozzle 36 which projects from the lower surface 32a of the lid 32 into the space 35 in the container body 31 and which opens at the lower end, forming an opening 33a. Thus, the opening 33a is located at the lower end of the projecting nozzle 36 projecting downward from the lower surface 32a of the lid 32.

A liquid film 40, composed of the liquid that has been introduced from the liquid introduction pipe 23b of the liquid introduction section 23, is formed on the interior surface of the cyclone body 21. The liquid film 40 is formed over an area from the lower end to the upper end of the container body 31, i.e. an area from the lower end of the container body 31 to the lower surface 32a of the lid 32.

The opening 33a of the gas inlet 33 provided in the lid 32 is located at the lower end of the projecting nozzle 36 projecting from the lower surface 32a of the lid 32, and opens at a position at a distance from the interior surface of the container body 31. Therefore, the liquid film 40 on the interior surface of the container body 31 will not be caught in the intake gas from the opening 33a of the gas inlet 33. This prevents the generation of a mist caused by the liquid film being caught in the intake gas.

On the other hand, since the gas inlet 33 extends downward at an angle with the orthogonal plane 21B of the cyclone body 21, the intake gas ejected from the gas inlet 33 hits the liquid film 40 formed on the interior surface of the container body 31 and located at a position facing the opening 33a. This enables particles, contained in the intake gas, to securely adhere to the liquid film 40, thus allowing the liquid film 40 to securely capture the particles.

If the intake gas ejected from the gas inlet 33 does not hit the liquid film 40 in the container body 31, then it may not be possible to cause particles in the intake gas to adhere to the liquid film 40. The particles may be forced to fly upward in the container body 31 and discharged from the exhaust pipe 24b.

In contrast, according to the present invention, the intake gas ejected from the gas inlet 33 is allowed to hit the liquid film 40. This makes it possible to cause particles in the intake gas to adhere to the liquid film 40, and to securely collect the particles in the liquid.

Fourth Embodiment

A collection section 12 consisting of a cyclone collector according to a fourth embodiment will now be described with reference to FIG. 10.

Figure 10:
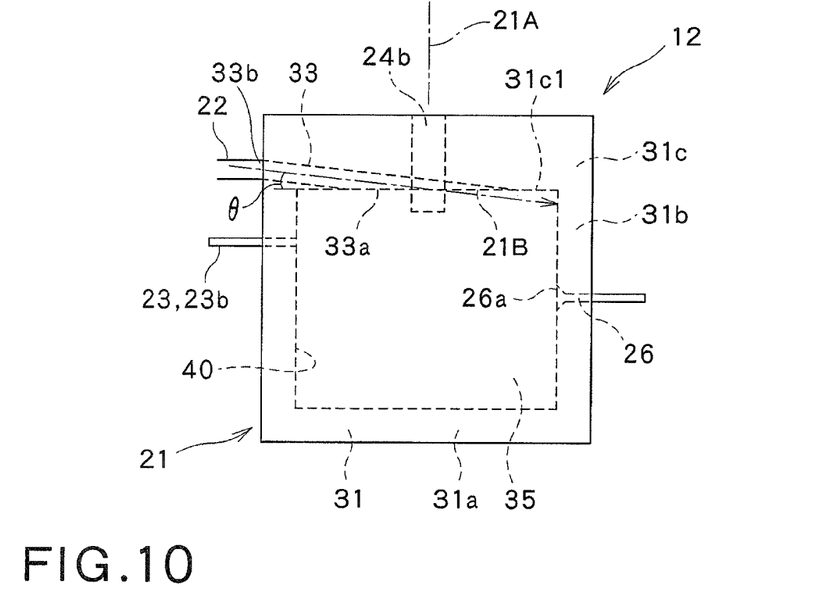
FIG. 10 is a side view of a cyclone body of a collection section according to a fourth embodiment of the present invention.

In the fourth embodiment shown in FIG. 10, the same symbols are used for the same components or elements as those of the first embodiment shown in FIGS. 1A through 1C, FIGS. 4A and 4B, and FIGS. 5 through 9, and a detailed description thereof is omitted.

FIG. 10 is a side view of the cyclone body 21 of the collection section 12.

As described above, the collection section 12 includes a cyclone body (also referred to as a container) 21, a gas introduction section 22 for introducing a gas into the cyclone body 21, and a liquid introduction section (also referred to as a liquid-film forming section) 23 for introducing a liquid into the cyclone body 21 and forming a liquid film 40 on the interior surface of the cyclone body 21.

More specifically, as shown in FIG. 10, the cyclone body (container) 21 of the collection section 12 includes a container body 31 which internally forms a truncated conical space 35 and which consist of a rotating body having an axis of rotation 21A. The conical body 35 is hermetically sealed as a whole and includes a lower-end portion 31a, an upper-end portion 31c and a side wall 31b extending between the lower-end portion 31a and the top-end portion 31c. The liquid introduction pipe 23b of the liquid introduction section 23 is connected to the side wall 31b.

The gas introduction section 22 is coupled to the upper-end portion 31c of the container body 31 of the cyclone body 21, and to the gas introduction section 22 is connected a connection end 33b of a gas inlet 33 formed in the upper-end portion 31c. In this embodiment, four gas introduction sections 22 are coupled to the upper-end portion 31c such that each gas introduction section 22 extends in a direction tangent to the wall surface of the cyclone body 21. The four gas introduction sections 22 are disposed at 90-degree intervals around the circumference of the upper-end portion 31c. Thus, four gas inlets 33, corresponding to the four gas introduction sections 22, are provided at 90-degree intervals in the upper-end portion 31c.

An exhaust pipe 24b is mounted in the center of the upper-end portion 31c. The exhaust pipe 24b extends upward from the space 35 in the container body 31 and penetrates the upper-end portion 31c. The liquid supply section 26 is mounted to the side wall 31b of the container body 31 of the cyclone body 21. The liquid supply section 26 is connected to the droplet forming section 13 via the feed pump 27 (see FIG. 5). An inlet 26a, which is inversely tapered toward the space 35, is formed at the entrance to the liquid supply section 26 mounted to the side wall 31b. Since the liquid supply section 26 is mounted to the side wall 31b in this embodiment, the liquid, which has a higher specific gravity than air, can be smoothly brought by centrifugal force from the inversely tapered inlet 26a to the liquid supply section 26.

The four gas inlets 33, provided in the upper-end portion 31c of the container body 31, will now be described. Each gas inlet 33 extends in the upper-end portion 31c downward at an inclination angle θ of 5° to 15° with an orthogonal plane 21B perpendicular to the axis 21A of the cyclone body 21. Each gas inlet 33 has an opening 33a that opens into the space 35 in the container body 31. The opening 33a opens in the same plane as the lower surface 31c1 of the upper-end portion 31c without projecting downward from the lower surface 31c1.

A liquid film 40, composed of the liquid that has been introduced from the liquid introduction pipe 23b of the liquid introduction section 23, is formed on the interior surface of the side wall 31b of the cyclone body 21. The liquid film 40 is formed over an area from the lower end to the upper end of the side wall 31b of the container body 31. However, the liquid film 40 does not reach the lower surface 31c1 of the upper-end portion 31c.

The openings 33a of the gas inlets 33 provided in the upper-end portion 31c of the container body 31 each open in the lower surface 31c1 of the upper-end portion 31c at a position at a distance from the side wall 31b of the container body 31. Therefore, the liquid film 40 on the interior surface of the side wall 31b of the container body 31 will not be caught in the intake gas from the openings 33a of the gas inlets 33. This prevents the generation of a mist caused by the liquid film being caught in the intake gas.

On the other hand, since the gas inlets 33 extend obliquely downward with respect to the orthogonal plane 21B of the cyclone body 21, the intake gas ejected from each gas inlet 33 hits the liquid film 40 formed on the interior surface of the side wall 31b of the container body 31 and located at a position facing the opening 33a. Therefore, particles contained in the intake gas move to the liquid film 40 due to centrifugal force. This enables the particles to securely adhere to the liquid film 40, thus allowing the liquid film 40 to securely collect the particles.

If the intake gas ejected from each gas inlet 33 does not hit the liquid film 40 on the interior surface of the side wall 31b of the container body 31, then it may not be possible to cause particles in the intake gas to adhere to the liquid film 40. The particles may be forced to fly upward in the container body 31 and discharged from the exhaust pipe 24b.

In contrast, according to the present invention, the intake gas ejected from the gas inlets 33 is allowed to hit the liquid film 40. This makes it possible to cause particles in the intake gas to adhere to the liquid film 40, and to securely collect the particles in the liquid. The cyclone body 21 shown in FIG. 10 may be used in a vertically inverted shape: the upper-end portion 31c and the lower-end portion 31a are interchanged, and the gas introduction sections 22 and the exhaust pipe 24b are disposed at lower positions.

Fifth Embodiment

A collection section 12 consisting of a cyclone collector according to a fifth embodiment will now be described with reference to FIG. 11.

Figure 11:
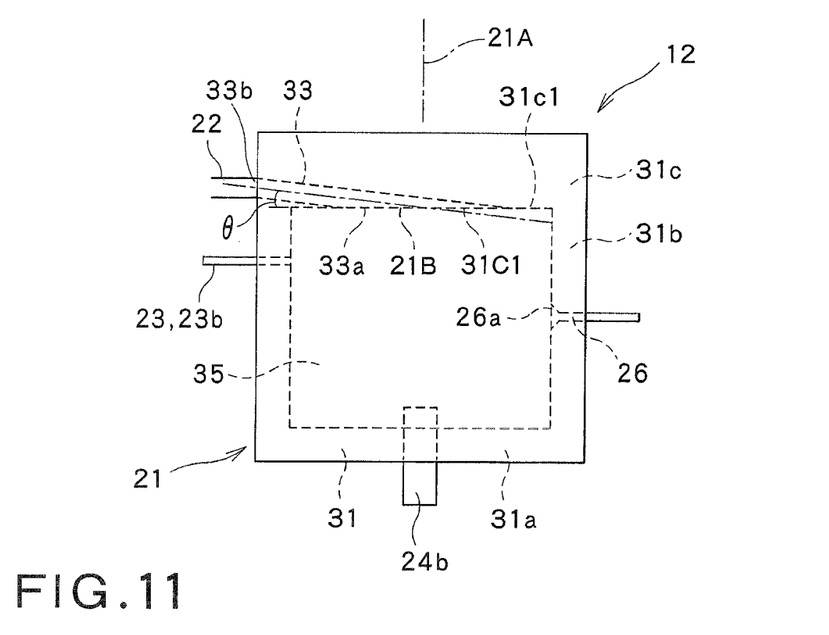
FIG. 11 is a side view of a cyclone body of a collection section according to a fifth embodiment of the present invention.

In the fifth embodiment shown in FIG. 11, the same symbols are used for the same components or elements as those of the first embodiment shown in FIGS. 1A through 1C, FIGS. 4A and 4B, and FIGS. 5 through 9, and a detailed description thereof is omitted.

FIG. 11 is a side view of the cyclone body 21 of the collection section 12.

As described above, the collection section 12 includes a cyclone body (also referred to as a container) 21, a gas introduction section 22 for introducing a gas into the cyclone body 21, and a liquid introduction section (also referred to as a liquid-film forming section) 23 for introducing a liquid into the cyclone body 21 and forming a liquid film 40 on the interior surface of the cyclone body 21.

More specifically, as shown in FIG. 11, the cyclone body (container) 21 of the collection section 12 includes a container body 31 which internally forms a truncated conical space 35 and which consist of a rotating body having an axis of rotation 21A. The conical body 35 is hermetically sealed as a whole and includes a lower-end portion 31a, an upper-end portion 31c and a side wall 31b extending between the lower-end portion 31a and the top-end portion 31c. The liquid introduction pipe 23b of the liquid introduction section 23 is connected to the side wall 31b.

The gas introduction section 22 is coupled to the upper-end portion 31c of the container body 31 of the cyclone body 21, and to the gas introduction section 22 is connected a connection end 33b of a gas inlet 33 formed in the upper-end portion 31c. In this embodiment, four gas introduction sections 22 are coupled to the upper-end portion 31c such that each gas introduction section 22 extends in a direction tangent to the wall surface of the cyclone body 21. The four gas introduction sections 22 are disposed at 45-degree intervals around the circumference of the upper-end portion 31c. Thus, four gas inlets 33, corresponding to the four gas introduction sections 22, are provided at 90-degree intervals in the upper-end portion 31c.

An exhaust pipe 24b is mounted in the center of the lower-end portion 31a. The exhaust pipe 24b extends downward from the space 35 in the container body 31 and penetrates the lower-end portion 31a. Since the exhaust pipe 24b is mounted in the center of the lower-end portion 31a, the exhaust pipe 24b is located opposite the gas introduction sections 22 in the upper-end portion 31c. This can increase the degree of freedom of the installation position of the gas introduction sections 22 in the upper-end portion 31c. The liquid supply section 26 is mounted to the side wall 31b of the container body 31 of the cyclone body 21. The liquid supply section 26 is connected to the droplet forming section 13 via the feed pump 27 (see FIG. 5). An inlet 26a, which is inversely tapered toward the space 35, is formed at the entrance to the liquid supply section 26 mounted to the side wall 31b. Since the liquid supply section 26 is mounted to the side wall 31b in this embodiment, the liquid having a high specific gravity can be smoothly brought by centrifugal force from the inversely tapered inlet 26a to the liquid supply section 26.

The four gas inlets 33, provided in the upper-end portion 31c of the container body 31, will now be described. Each gas inlet 33 extends in the upper-end portion 31c downward at an inclination angle $\theta$ of 5° to 15° with an orthogonal plane 21B perpendicular to the axis 21A of the cyclone body 21. Each gas inlet 33 has an opening 33a that opens into the space 35 in the container body 31. The opening 33a opens in the same plane as the lower surface 31c1 of the upper-end portion 31c without projecting downward from the lower surface 31c1.

A liquid film 40, composed of the liquid that has been introduced from the liquid introduction pipe 23b of the liquid introduction section 23, is formed on the interior surface of the side wall 31b of the cyclone body 21. The liquid film 40 is formed over an area from the lower end to the upper end of the side wall 31b of the container body 31. However, the liquid film 40 does not reach the lower surface 31c1 of the upper-end portion 31c.

The openings 33a of the gas inlets 33 provided in the upper-end portion 31c of the container body 31 each open in the lower surface 31c1 of the upper-end portion 31c at a position at a distance from the side wall 31b of the container body 31. Therefore, the liquid film 40 on the interior surface of the side wall 31b of the container body 31 will not be caught in the intake gas from the openings 33a of the gas inlets 33. This prevents the generation of a mist caused by the liquid film being caught in the intake gas.

On the other hand, since the gas inlets 33 extend obliquely downward with respect to the orthogonal plane 21B of the cyclone body 21, the intake gas ejected from each gas inlet 33 hits the liquid film 40 formed on the interior surface of the side wall 31b of the container body 31 and located at a position facing the opening 33a. Therefore, particles contained in the intake gas move to the liquid film 40 due to centrifugal force. This enables the particles to securely adhere to the liquid film 40, thus allowing the liquid film 40 to securely collect the particles.

If the intake gas ejected from each gas inlet 33 does not hit the liquid film 40 on the interior surface of the side wall 31b of the container body 31, then it may not be possible to cause particles in the intake gas to adhere to the liquid film 40. The particles may be forced to fly upward in the container body 31 and discharged from the exhaust pipe 24b.

In contrast, according to the present invention, the intake gas ejected from the gas inlets 33 is allowed to hit the liquid film 40. This makes it possible to cause particles in the intake gas to adhere to the liquid film 40, and to securely collect the particles in the liquid.

DESCRIPTION OF THE SYMBOLS 10 measuring apparatus
11 dust removal section
12 collection section
13 droplet forming section
14 droplet sorting section
15 measuring section
16 liquid recovery section
17 suction pump
18 main pipe
18*a* narrowed portion
19 coarse dust removal section
21 cyclone body
21A axis
21B orthogonal plane
22 gas introduction section
23 liquid introduction section
23*a* tank
23*b* liquid introduction pipe
31 container body
31*a* lower-end portion
31*b* side wall
31*c* upper-end portion
32 lid
32*a* lower surface
33 gas inlet
33*a* opening
33*b* connection end
35 space
36 projecting nozzle
40 liquid film

The invention claimed is:

1. A cyclone collector, comprising:
a container which internally forms a space and which consists of a rotating body having an axis of rotation, and including an upper-end portion, a lower-end portion, and a side wall extending between the upper-end portion and the lower-end portion;
a liquid-film forming section, provided for the container, for forming a liquid film having a certain height on an interior surface of the side wall,
a gas inlet provided in the container and having an opening that opens in the container; and
an exhaust pipe provided in the container,
wherein the gas inlet extends toward the space at an angle with an orthogonal plane perpendicular to the axis of rotation of the container, and wherein the entire area of the opening of the gas inlet is located outside an area where the liquid film exists, and an intake gas is ejected from the gas inlet toward the liquid film.

2. The cyclone collector according to claim 1, wherein the gas inlet is provided in the upper-end portion of the container.

3. The cyclone collector according to claim 1, wherein the liquid-film forming section forms the liquid film on the interior surface of the side wall such that it extends upward from the lower-end portion of the container.

4. The cyclone collector according to claim 1, wherein the gas inlet is provided in plural numbers.

5. The cyclone collector according to claim 2, wherein the gas inlet is provided in the upper-end portion of the container, and the opening opens into the space in the container.

6. The cyclone collector according to claim 2, wherein the gas inlet is provided in the upper-end portion of the container, and has a projecting nozzle which projects from the surface of the upper-end portion and which, at its front end, has said opening.

7. The cyclone collector according to claim 1, wherein a liquid supply section is mounted to the lower-end portion of the container.

8. The cyclone collector according to claim 1, wherein a liquid supply section is mounted to the side wall of the container.

* * * * *